Patented Oct. 17, 1950

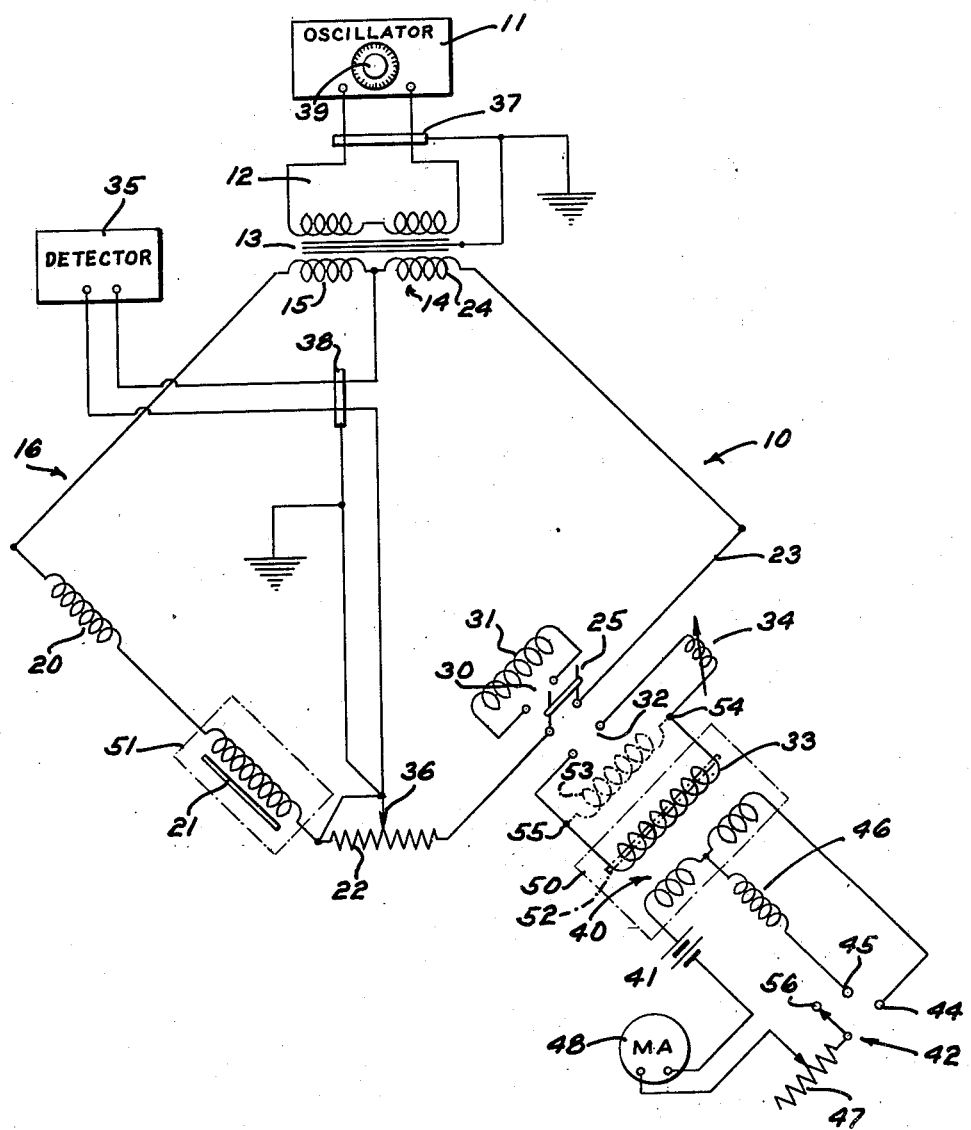

2,526,338

UNITED STATES PATENT OFFICE 2,526,338

ELECTRICAL TESTING INSTRUMENT

Arthur J. Ehlschlager, Elmwood Park, Ill., assignor to Western Electric Company, Incorporated, New York, N. Y., a corporation of New York Application February 6, 1947, Serial No. 726,747

12 Claims. (Cl. 175—183)

This invention relates to electrical testing instruments and more particularly to an apparatus for making repetitive alternating current bridge measurements at a predetermined current level.

In cases where alternating current bridge measurements are dependent upon a predetermined current value flowing through the branches of the bridge, it is necessary to measure the current in the branches each time the bridge is used to ensure that the proper amount of current is flowing through the bridge branches. Where the current is critical within very narrow limits the usual current meters are not sensitive enough and in these instances it may be necessary to use a potentiometer method to measure this current. This method though very accurate is cumbersome and not feasible where repetitive measurements are to be made with any reasonable speed; a bridge which could be readily and repeatedly adjusted to and balanced at a predetermined current level without actually measuring the current would be ideal for this type of measurement.

In certain types of extremely sensitive magnetometers the inductance of the pickup coils must be responsive to and vary in accordance with extremely small changes in the magnetic field being detected and observed. The variations in the inductance are caused by the delicate permeability changes of the ferromagnetic cores in the pickup coils due to the changes in the strength of the surrounding field. The degree of change in permeability due to changes in field strength is very critical and it is essential that this curvature of change be known in order to establish the inductance characteristics of the pickup coil during changes of field strength.

Once the other physical constants of a coil are fixed the inductance may be varied only by a change in the permeability of the core. In order to match the coil and the other elements of the magnetometer the core must have a permeability versus field-strength change curvature within certain predetermined limits. Normally the measurement of permeability and inductance variations due to changes in surrounding field strength is a laboratory problem requiring laboratory instruments and technique which preclude testing coils and cores with a speed consistent with mass production. However, an alternating current bridge which could be readily and repeatedly adjusted to and balanced at a predetermined current level without recourse to current indicators and other forms of actual current measurement or computation would be an excellent means for speedily testing such coils and cores.

Objects of this invention are to provide a new and efficient apparatus for making alternating current bridge measurements and for measuring characteristics of inductance coils and inductance cores.

In accordance with one embodiment of this invention an alternating current equal ratio arm bridge is provided which has a current-sensitive (inductively variable with current change) inductance coil with a ferro-magnetic core connected in one branch and, which has selectively connected in an adjacent branch, either a current-insensitive bridge current adjusting coil (inductively insensitive to current changes) or a current-insensitive finely adjustable inductometer connected in series with a test coil in which a core to be tested may be inserted. A magnetic field-producing coil is disposed around the test coil to subject the test coil to a magnetic field. The inductance of the bridge current adjusting coil is constant and is equal to the inductance, at the desired current value, of the branch of the bridge wherein the current-sensitive coil is connected, and the inductometer is set at a predetermined value so that it may be adjusted to either add or subtract inductance from its branch of the bridge. The inductance of the test coil may be the same as that which the current sensitive coil would have if its core were removed.

According to the preferred practice, the bridge is energized with an alternating current and it is balanced with the bridge current adjusting coil connected into the bridge. A specimen core is then inserted in the test coil which is substituted for the bridge current adjusting coil in the circuit, and a magnetic field of predetermined strength is set up around the test coil after which the bridge is balanced by adjusting the inductometer. The amount of inductance added or subtracted from the circuit by the inductometer to balance the bridge is an indication of the permeability characteristics of the core specimen with a predetermined current flow through the bridge branches.

A complete understanding of the invention will be had by reference to the following detailed description taken in conjunction with the single figure drawing which is a circuit diagram of a preferred embodiment of the invention.

As shown in the drawing, the apparatus comprises an equal ratio arm bridge 10 which may be energized by an oscillator 11 having a predetermined fixed frequency whose output is connected to the primary winding 12 of a transformer 13 having an accurately split secondary winding 14. It is important to stress that once the bridge is set up and adjusted for operation, the oscillator must be maintained at the same frequency for all subsequent measurements and tests. One side 15 of the secondary winding 14 is part of a branch 16 of the bridge and is connected to a coil 20 which is connected in series with a current-sensitive inductance coil 21. The other end of the coil 21 is connected to one terminal of a balancing resistor 22. Another branch 23 of the bridge comprises the other half 24 of the secondary winding 14 connected to one pole of a double pole-double throw switch 25 whose second pole is connected to the other end of the resistor 22. One pair of contacts 30 of the switch 25 are connected to a current-insensitive coil 31, and the other pair of contacts 32 are connected to a test coil 33 and a calibrated current-insensitive inductometer 34 connected in series with each other, thus enabling, by operation of the switch 25, the selection of either the coil 31 or the coil 33 and the inductometer 34 for connection into the branch 23. A suitable detector 35 is connected between the center of the secondary winding 14 and a variable contact 36 on the resistor 22. The oscillator and detector leads are suitably shielded as shown at 37 and 38, respectively. The variable contact 36 is also connected to that end of the resistor 22 which is connected to the coil 21 in order to prevent any impedance change in the branch 16 while the contact 36 is being adjusted across the resistor 22.

Means for setting up a magnetic field around the test coil 33 comprise a split coil 40 which is so connected to a battery 41 or other source of power that either one-half or the entire coil 40 may be energized by the battery. A switch 42 connects the battery either to the entire coil 40, through a contact 44 or through a contact 45 to one-half the coil 40 through a coil 46. which together with the one-half of the coil 40 in the circuit, gives an equivalent impedance of the entire coil 40 so that in either position of the switch 42, excepting at zero position 56, the amount of current through either one-half or the whole coil will be the same. A variable resistor 47 and a current-meter 48 may be provided to aid in maintaining the current at any desired value. The test coil 33 is located within the coil 40 so that the field set up by coil 40 will envelope the other coil, and to prevent any extraneous magnetic fields from influencing the coil 33 at any time, a magnetic shield 50 is provided around the coils 33 and 40.

In the preferred embodiment of this invention, the current-sensitive coil 21 is in the nature of a standard since it possesses, at a predetermined current level, the required inductance characteristics of the magnetometer pickup coils and cores associated therewith, for the testing of which this embodiment of the invention was designed. To exclude all external influence the coil 21 is provided with suitable magnetic shielding as shown at 51. To facilitate the testing, the inductometer should be set at a predetermined inductive value between zero and maximum so that it may be adjusted in either direction during the test, that is, to either add or subtract inductance from the branch 23 during the test and the inductance value of the inductometer at this predetermined setting may be equal to the inductance value of the coil 20. The coil 31 and the inductometer must be current-insensitive and of constant inductance. The test coil 33 may have the same physical and electrical characteristics as the coil 21 would have with its regular core removed therefrom.

Before testing any cores the bridge should be adjusted as follows: the oscillator is adjusted to generate a power output of a fixed predetermined frequency to energize the bridge through the transformer 13. The switch 25 is operated to connect the coil 31 into the branch 23 and the bridge is balanced by means of the variable resistor contact 36 and by adjusting the current output level of the oscillator with a suitable output level control 39. The adjustment of the current is necessary because the bridge will balance only when a predetermined level of current is flowing therethrough, at which point the inductance of the branches 16 and 23 will be equal. The condition of the bridge with respect to balance will be indicated by the detector 35 which should be well filtered to reject all harmonics and frequencies other than the specific frequency of the oscillator. When the bridge has been balanced with the predetermined current required for the test flowing in the bridge branches, the switch 25 may then be operated to its other position thereby disconnecting the coil 31 from the branch 23 and connecting the test coil 33 and the inductometer 34 into the branch 23.

A specimen core 52 to be tested may now be inserted within the coil 33. With the switch 42 at its zero position 56 the bridge is again balanced by adjusting the inductometer 34 and the variable resistor contact 36 without disturbing the oscillator output. The inductance reading of the inductometer may now be noted as an indication of the characteristics of the specimen core under test when the coil 33 and the specimen core are not influenced by any extraneous magnetic field.

In order to ascertain the permeability changes, if any, in the specimen core when subjected to outside magnetic forces, the coil 33 is surrounded by a magnetic field of a predetermined strength, for example, 300 milligauss which may be created by operating switch 42 to connect battery 41 to send a current of sufficient strength through one-half the coil 40. While the coil 33 and the core within are thus subjected to the magnetic field, the bridge is again balanced by adjusting the inductometer 34 and the variable resistor contact 36. The position of the inductometer is again noted as an indication of the characteristics of the specimen core when subjected to a magnetic field of 300 milligauss. Both halves of the coil 40 being identical, the field strength may be exactly doubled by operating the switch 42 from the contact 45 to the contact 44 to send the same current through the entire coil 40 after which the bridge may again be balanced by adjusting the inductometer 34 and the variable resistor contact 36. The position of the inductometer may again be noted as indicative of the permeability characteristic of the specimen core under test when subjected to the influence of a magnetic field of 600 milligauss.

The inductance changes required in the bridge branch 23 in order to balance the bridge while the specimen core is subjected to magnetic fields of different strengths may be plotted as a curve indicating the permeability change versus change in the surrounding field strength or inductance change versus surrounding field strength change.

Although the invention herein has been described in connection with the testing of inductance cores, it will be apparent to those skilled in the art that the invention may be used for making other bridge measurements that require a rapidly and repeatedly balanced bridge with a predetermined value of current flowing through its branches without the necessity of measuring or calibrating the current flow every time the bridge is operated. An inductive device 53 may be tested by connecting it in place of coil 33 at the points 54 and 55 and, after the bridge is balanced with the coil 31 in the circuit by adjusting the oscillator output level and the variable resistor contact 36, the switch 25 may be operated to introduce the device 53 and the calibrated inductometer 34 into the branch 23 in place of the coil 31. The bridge is then balanced by adjusting the inductometer 34 and the variable resistor contact 36 and the reading thereon will be an indication of the inductive characteristics of the device 53. If desired, the device may be tested without the inductometer 34 by disconnecting the coil 33 and the inductometer 34 from the switch contacts 32 and substituting therefor the device under test by connecting it to the switch contacts 32. After balancing the bridge with the coil 31 in the circuit as previously described the switch 25 may be operated to connect the device under test to the branch 23, and the degree of unbalance of the bridge, or, if the inductive device under test is adjustable, the required adjustments to effect a balance of the bridge, would be indications of the inductive characteristics of the device under test.

What is claimed is:

1. An electrical measuring apparatus comprising an electrical bridge having a plurality of branches, means for energizing said bridge at a selected frequency, current-sensitive means connected in one of said branches to vary the inductance of said branch in accordance with the value of current in said branch, current-insensitive means connected in another of said branches for inductively balancing said bridge with a desired value of current flowing in said branches a test coil for receiving a test core to be tested, means for selectively substituting said test coil for said current-insensitive means in said bridge and a variable inductance coupled to said test coil for balancing said bridge with said core in said test coil.

2. An electrical measuring apparatus comprising an electrical bridge having a plurality of branches, a current-responsive inductance coil connected in one of said branches, said inductance being variable in proportion to the current flowing through said branch, a current-insensitive inductance coil selectively connectible in another of said branches, said current-insensitive inductance coil having a predetermined inductance value such that the total inductance value of said other branch will be equal to the inductance value of the first said branch when a desired predetermined current is flowing through the first said branch, a test coil for receiving a core to be tested adapted to replace said current-insensitive inductance in said bridge, a variable inductance coupled to said test coil for balancing said bridge with said core in said test coil, and means for applying a direct current magnetization to said core, said last means comprising a magnetizing coil coupled to said test coil, and means for energizing said magnetizing coil with direct current.

3. An apparatus for determining characteristics of a core when subjected to a predetermined field strength comprising an electrical bridge having a plurality of branches, means associated with said bridge for coupling a source of energy to said bridge, an inductance coil responsive to current connected in one of said branches to vary the inductance of said branch in accordance with the current flowing through said branch, a current-insensitive inductance coil connected in another of said branches, said current-insensitive coil having an inductance value such that the total inductance value of said other branch will be substantially equal to the value of inductance of the first said branch at a desired predetermined current level at which it is desired to balance said bridge, a test coil for receiving cores to be tested, an adjustable inductance connected in series with said test coil, means to selectively substitute said series connected test coil and said adjustable inductance for said current-insensitive inductance in said bridge, and means for creating a magnetic field around said test coil.

4. In an electrical bridge having a plurality of arms, a current-responsive means connected to one of said arms for varying the inductance of said arm in accordance with the amount of current flowing in said arm, a current-insensitive means of constant inductance selectively connectible in another of said arms, said current insensitive means having an inductive value equal to that of the first said arm when a predetermined desired current value is flowing through the first said arm, a test coil, a variable inductance in series with said test coil, means for selectively substituting said series-connected test coil and variable inductance for said current-insensitive means, and means for setting up a unit directional-current magnetic field around said test coil.

5. An electrical bridge having a plurality of arms, means associated with said bridge for energizing said bridge with alternating current, a current-sensitive device connected in one of said arms for varying the inductance of said arm in accordance with the amount of current flowing therethrough, a current-insensitive device selectively connectible in another of said arms, the inductive value of said current-insensitive device being equal to that of the first said arm when a predetermined value of current is flowing therethrough, means associated with said bridge for balancing said bridge, means connected to said bridge to indicate the degree of unbalance, if any, of said bridge, a test coil for receiving a core to be tested adapted to replace said current-insensitive device in said bridge, a variable inductance coupled to said test coil for balancing said bridge with said core in said test coil, and means for applying direct-current magnetization to said core.

6. In an apparatus for making electrical measurements, an electrical bridge having a plurality of arms, a current-responsive inductive device connected in one of said arms for varying the inductance of said arm in accordance with the amount of current flowing through said arm, a current-insensitive means of constant inductance connected in another of said arms, said current-insensitive means having an inductive value substantially equal to that of the first said arm when a predetermined amount of current is flowing through said bridge, a test coil adapted to receive a specimen core to be tested, switching means for selectively connecting either said current-insensitive means or said test coil into said other arm, and adjustable means for providing a magnetic field around the said test coil.

7. In an apparatus for making electrical measurements, an electrical bridge having a plurality of arms, a current-responsive inductive device connected in one of said arms for varying the inductance of said arm in accordance with the amount of current flowing through said arm, a current-insensitive means of constant inductance connected in another of said arms, said current-insensitive means having an inductive value substantially equal to that of the first said arm when a predetermined amount of current is flowing through said bridge, a test coil adapted to receive a specimen core to be tested, and switching means for selectively connecting either said current-insensitive means or said test coil into said other arm.

8. An electrical bridge having a plurality of arms, means for energizing said bridge at a selected frequency and current level, an inductance coil having a magnetic core of different permeability at different values of magnetization in one of said arms, means selectively connectible in another of said arms for balancing said bridge at a selected frequency and current level, a test coil for receiving a core to be tested adapted to replace said balancing coil in said bridge, and a variable inductance in series with said test coil for rebalancing the bridge with said core in said test coil.

9. An electrical bridge having a plurality of arms, means for energizing said bridge at a selected frequency and current level, an inductance coil having a magnetic core of different permeability at different values of magnetization in one of said arms, means selectively connectible in another of said arms for balancing said bridge at a selected frequency and current level, a test coil for receiving a core to be tested adapted to replace said balancing coil in said bridge, a variable inductance in series with said test coil for rebalancing the bridge with said core in said test coil, and means for applying a predetermined value of direct-current magnetization to said test core to measure the permeability of said test core at various values of magnetization.

10. An electrical bridge having a plurality of arms, means for energizing said bridge at a selected frequency and curent level, an inductance coil having a magnetic core of different permeability at different values of magnetization in one of said arms, means selectively connectible in another of said arms for balancing said bridge at a selected frequency and current level, a test coil for receiving a core to be tested adapted to replace said balancing coil in said bridge, a variable inductance in series with said test coil for rebalancing the bridge with said core in said test coil, means for applying a predetermined value of direct-current magnetization to said test core to measure the permeability of said test core at various values of magnetization, said last means comprising a magnetizing coil around said test coil, and means for energizing said magnetizing coil with direct current.

11. An electrical bridge having a plurality of arms, means for energizing said bridge at a selected frequency and current level, an inductance coil having a magnetic core of different permeability at different values of magnetization in one of said arms, means selectively connectible in another of said arms for balancing said bridge at a selected frequency and current level, a test coil for receiving a core to be tested adapted to replace said balancing coil in said bridge, a variable inductance in series with said test coil for rebalancing the bridge with said core in said test coil, means for applying a predetermined value of direct-current magnetization to said test core to measure the permeability of said test core at various values of magnetization, said last means comprising a magnetizing coil having a plurality of sections around said test coil, and means for selectively energizing one or more of said sections with the same value of direct-current flow therethrough thereby to effect a change of magnetic field strength with one value of current.

12. An electrical bridge having a plurality of arms, means for energizing said bridge at a selected frequency and curent level, an inductance coil having a magnetic core of different permeability at different values of magnetization in one of said arms, means selectively connectible in another of said arms for balancing said bridge at a selected frequency and current level, a test coil for receiving a core to be tested adapted to replace said balancing coil in said bridge, a variable inductance in series with said test coil for rebalancing the bridge with said core in said test coil, means for applying a predetermined value of direct-current magnetization to said test core to measure the permeability of said test core at various values of magnetization, said last means comprising a magnetizing coil having two sections in series, a compensating coil, and means for selectively applying direct current to said two sections in series or to one of said sections through said compensating coil.

ARTHUR J. EHLSCHLAGER.

REFERENCES CITED

The following references are of record in the file of this patent:

UNITED STATES PATENTS

| Number | Name | Date |
| --- | --- | --- |
| 1,665,325 | Peterson | Apr. 10, 1928 |
| 1,896,737 | Zuschlag | Feb. 7, 1933 |
| 1,897,634 | De Forest | Feb. 14, 1933 |
| 2,046,704 | Slonczewski | July 7, 1936 |
| 2,124,577 | Knerr | July 26, 1938 |